Patented Feb. 8, 1949

2,461,362

UNITED STATES PATENT OFFICE 2,461,362

PREPARATION OF 2-3 METHYL BUTADIENE 1-3

David W. Young, Roselle, and Charles E. Britton, Elizabeth, N. J., assignors to Standard Oil Development Company, a corporation of Delaware No Drawing. Application February 9, 1945, Serial No. 577,138

4 Claims. (Cl. 260—681)

This invention relates to a method for the preparation of diolefins and more particularly relates to a method for the preparation of conjugated diolefins by the dehydration of dihydroxy alcohols or glycols.

It is known that certain types of ketones or alcohols can be dehydrated by contacting them with a catalyst to form unsaturated hydrocarbons. For example, it is known that pinacol can be dehydrated to dimethyl butadiene and pinacoline by passing it over activated alumina at a temperature between 420° and 470° C. under reduced pressure. The pinacoline obtained may similarly be dehydrated to yield further amounts of dimethyl butadiene by passing it over the same catalyst under vacuum.

Similarly 2-methyl, 2-4 pentandiol is easily dehydrated to give the isomers 2-methyl, 1,3-pentadiene and 4-methyl, 1,3-pentadiene, of which the former is the main constituent.

It is also known that pinacol may be dehydrated by the action of hydrobromic acid but the yield of dimethyl butadiene is low due to the necessity of having water present. Furthermore, efficient fractionation of the resulting product is hindered.

While the above process for the dehydration of pinacol or pinacoline are adequate for experimentation, they are not suitable for commercial application because of the low yield and the difficulty of controlling the optimum conditions so as to give the highest yields of dimethyl butadiene.

It has now been found that the disadvantages inherent in the use of hydrobromic acid in a commercial application can be avoided by carrying out the dehydration of pinacol or pinacoline and other polyhydroxy alcohols in the presence of a hydrocarbon-soluble Friedel-Crafts type catalyst containing bromine.

According to this invention, the dihydroxy alcohol is treated with a hydrocarbon-soluble Friedel-Crafts type catalyst containing bromine at a temperature between room temperature and 75° C. The catalysts should have a solubility of 1% to 10% by weight in the dihydroxy alcohol at room temperature, and preferably a solubility of at least 0.1% in pure propane at −78° C.

Suitable hydrocarbon-soluble Friedel-Crafts type catalysts include aluminum bromide, aluminyl bromides such as $AlBr_3.AlOBr$, $(AlBr_3)_4.AlOBr$, $(AlBr_2Cl)_4.AlOBr$, and $(Al_2Br_5Cl)_3.AlOBr$, aluminum bromide complexes with various hydrocarbons such as isoprene, propylene, isobutylene, etc. as well as boron bromide $BBr_3$, boryl bromide $BBr_3.BOBr$ and $TiBr_4$ and $TiOBr_2$ and $TiBr_3Cl$.

The improvements and advantages obtained by the present process when using the hydrocarbon-soluble bromine-containing Friedel-Crafts catalyst of the present invention are illustrated in the following examples.

Example 1

Pinacol, 500 grams, was treated at room temperature with 2.8 grams of aluminyl bromide. The catalyst went into solution and the color change of the liquid was from dark red to brown. The metal halide-treated pinacol was then placed in a still. In the first distillation the B. P+. was found to be 70°–80° C., some water coming over with the product. The overhead was redistilled and a true B. P+. of 69°–70° C. was obtained in a still that had an eight to ten theoretical plate column. Yield of 2-3 methyl butadiene 1-3 was 84.7 mol %. By-product, 15.3%, was t-butyl methyl ketone.

$(CH_3)_3C(CO)CH_3$

The t-butyl methyl ketone may be treated with further amounts of aluminyl bromide to give increased yields of 2-3 methyl butadiene.

Example 2

Five hundred milliliters of 2-methyl, 2,4-pentandiol (Eastman) was placed in a flask with 12 grams of the catalyst and refluxed for four hours at 65.0° C., with occasional shaking. This mixture was then placed on a still, taking the cut boiling within the range of 74.0°–78.0° C. The color of the alcohol turned to a very dark brown after refluxing. It was evident that some water came over with the first cut.

A 50 cc. portion of the main cut was then placed in a small 20 plate column for distillation. Sixty-six volume per cent of this cut boiled constantly at 75.0° C., the remaining portion boiling below this range. The main fraction was a water-white liquid of pleasant odor and added bromine instantly.

The true boiling point of 2-methyl, 1,3-pentadiene and its geometrical isomers is 75.0° to 77.0° C.

From the above experiments it is evident that high yields of dimethyl butadiene can be obtained by the use of oil-soluble bromine-containing Friedel-Crafts type catalysts.

Although the present invention has been described with a certain degree of particularity, it is understood that the present disclosure has been made only by way of example and that numerous changes in the details of the process may be resorted to without departing from the spirit and scope of the invention as hereinafter claimed.

The nature and objects of the present invention having thus been set forth and a specific embodiment of the same given, what is claimed as new and useful and desired to be secured by Letters Patent is:

1. A method for preparation of conjugated diolefins by contacting in the liquid phase aliphatic dihydroxy alcohols with aluminyl bromide, carrying out the reaction at room temperature and separating a diolefin by fractional distillation.

2. A process for the preparation of methyl pentadiene comprising contacting 2-methyl-2-4-pentanediol with aluminyl bromide and carrying out the reaction at 65° C.

3. A method for the preparation of a conjugated diolefin comprising contacting an aliphatic glycol in the liquid phase at a temperature between room temperature and 75° C. in a reaction zone with a catalyst selected from the group consisting of: $AlBr_3$, $AlOBr$, $AlBr_3 \cdot AlOBr$, $(AlBr_3)_4 \cdot AlOBr$, $(AlBr_2Cl)_4 \cdot AlOBr$, $(Al_2Br_5Cl)_8 \cdot AlOBr$, $AlBr_3$-hydrocarbon complexes, $BBr_3$, $BBr_3 \cdot BOBr$, $TiBr_4$, $TiOBr_2$, and $TiBr_3Cl$, and distilling the conjugated diolefin from the reaction zone.

4. A process for the preparation of 2,3-dimethyl butadiene 1-3, comprising contacting pinacol in a reaction zone with aluminyl bromide at room temperature, and distilling 2,3-dimethyl butadiene-1,3 from the reaction zone.

DAVID W. YOUNG.
CHARLES E. BRITTON.

REFERENCES CITED

The following references are of record in the file of this patent:

UNITED STATES PATENTS

| Number | Name | Date |
|---|---|---|
| 1,179,408 | Delbruck et al. | Apr. 18, 1916 |
| 2,350,517 | Mikeska et al. | June 6, 1944 |

FOREIGN PATENTS

| Number | Country | Date |
|---|---|---|
| 17,235 | Great Britain | July 21, 1912 |
| 61,916 | Switzerland | 1913 |

OTHER REFERENCES

Calvert India Rubber Review, 26, No. 9, pages 48 to 50, 52, 54, (1926).